United States Patent
Westbergh

[11] Patent Number: 6,131,507
[45] Date of Patent: Oct. 17, 2000

[54] BAKING CART

[76] Inventor: Jan Westbergh, Etelhem, S-62013 Stånga, Sweden

[21] Appl. No.: 09/353,654

[22] Filed: Jul. 15, 1999

Related U.S. Application Data

[63] Continuation of application No. PCT/SE98/00006, Jan. 9, 1998.

[30] Foreign Application Priority Data

Jan. 21, 1997 [SE] Sweden .................. 9700160-6

[51] Int. Cl.[7] ................ A21B 3/07; F24C 15/16
[52] U.S. Cl. ................ 99/427; 99/448; 99/426; 126/339; 126/337 R
[58] Field of Search ............... 99/426, 448, 416, 99/483, 349, 353, 427; 249/82, 120, 121, 126; 126/337 R, 339

[56] References Cited

U.S. PATENT DOCUMENTS

| | | | |
|---|---|---|---|
| 1,986,115 | 1/1935 | Offenhauser | 99/349 |
| 3,750,563 | 8/1973 | Tonjum | 99/349 X |
| 4,020,310 | 4/1977 | Souder, Jr. et al. | 99/416 |
| 5,499,575 | 3/1996 | Handel et al. | 99/349 |
| 5,549,040 | 8/1996 | Naramura | 99/349 |

FOREIGN PATENT DOCUMENTS

| | | |
|---|---|---|
| 2616329 | 11/1977 | Denmark . |
| 24278 | 3/1895 | United Kingdom . |
| WO 92/11765 | 7/1992 | WIPO . |

*Primary Examiner*—Reginald L. Alexander
*Attorney, Agent, or Firm*—Pillsbury Madison & Sutro LLP

[57] ABSTRACT

A stand or cart for baking covered molds, preferably being a cart for rack ovens, includes shelves put into or removed from the cart from a same side. Approximately at the middle of the adjacent sides there is at each side a vertical bar (10, 11). Each bar is movalbe in vertical direction and mounted in slide bushings (12, 13), for each bar there is one bushing at the upper and lower frame. In the bars (10, 11) there are a number of holes (20) which corresponds to the number of shelves. The holes are positioned so that they are at the same height as the upper rims of the molds when the bars are in their lower positions. For each pair of holes there is a shaft (15) which extends itself between the bars and through the corresponding holes. A lid (14) is mounted to each shaft (15).

4 Claims, 1 Drawing Sheet

BAKING CART

This is a Continuation of International Application No. PCT/SE98/00006 filed Jan. 9, 1998.

FIELD OF THE INVENTION

The present invention is for a baking means such as a stand or a cart for baking in closed molds. Preferably the baking means is a cart for rack ovens.

BACKGROUND OF THE INVENTION

Rack ovens are frequently used in bakeries for baking of large quantities of loaves of bread and the like. These ovens have hearths which extend themselves so far downwards that they may be loaded by gathering a desired number of baking molds on a cart which is pushed into the oven. On the cart, there are baking molds at several levels up to a highest useable height which means that the height of the cart may be more than 1500 mm, its width and length are typically 400–700 mm. In a common embodiment of the cart, there are ten shelves on which the molds are put In order to make the job easier the shape of the shelves may be adapted to that of the molds. The shelves may also be removable and movable on guides. If the molds are to be covered during the baking removable lids are used and usually one lid covers all of the molds on one shelf.

In order that they shall withstand the heat, lids are made from steel and due to their size they become comparatively heavy. These lids are also placed at different heights, and thus the handling of the lids is time consuming, complicated and ergonically disadvantageous. In many cases one will lift the shelf, molds with contents and lid together as one unit, which is comparatively heavy.

SUMMARY OF THE INVENTION

It is an object of the present invention to simplify or eliminate the handling of the lids to achieve a faster process and to substantially eliminate ergonomic disadvantages associated with prior arrangement.

BRIEF DESCRIPTION OF THE DRAWINGS

The invention will below be described with reference to the embodiment which is shown in the enclosed figures.

DETAILED DESCRIPTION OF THE INVENTION

Figure 1:
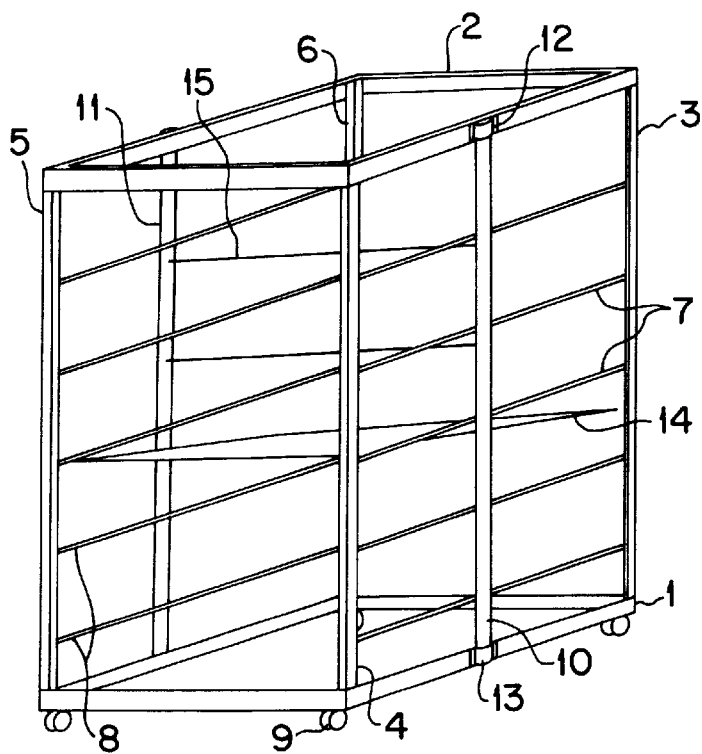
FIG. 1 is a perspective view of a rack oven cart according to the present invention.
Figure 3:
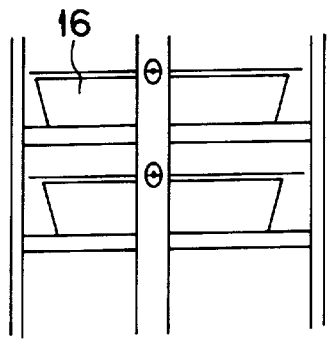
FIG. 3 is a partial back view of the cart of FIG. 1 at right angle to that of FIG. 2.

The cart shown in FIG. 1 has a lower, horizontal frame 1 and a corresponding upper frame 2.These, as well as the other parts of the cart, are made from steel of a quality which is suitable for the operating conditions which exist in bakery operations with oven temperatures up to 250° C. The frames are connected with each other by comer posts 3, 4, 5, 6. Between the posts there are rails or guides 7, 8 arranged in pairs at the same height which are intended to carry free or removable shelves or plates 18. A desired number of baking molds 16 are placed on each shelf 18. One cart is often adapted for 8–12 shelves, the cart shown in the figures has somewhat fewer shelves.

Figure 2:
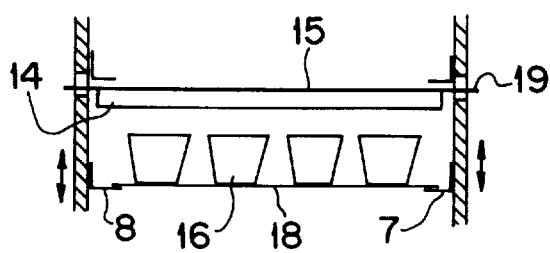
FIG. 2 is a partial side view of the cart of FIG. 1 viewed from the operating side.

In operation, molds and/or shelves are taken out from and put into the cart from the same side which is the side which is the front side in FIGS. 1 and 2. Appproximately in the middle of the sides which are at right angles thereto there are at each side a vertical bar 10, 11. Each of the bars is movable in vertical direction and mounted in slide bushings 12, 13, for each bar there is one bushing at each of the upper and lower frames. The bars may be made from iron plates, tubes or profiled bars of for example L- or U-shape. Moving of the bars is enabled by means of arrangements which are operated by a foot pedal, not shown in the figures. The motion is delimited by an upper and a lower end position.

In the bars 10, 11 there are a number of holes 20 which corresponds to the number of shelves. The holes are so positioned that they are about at even height with the upper rims of the molds 16 when the bars are in their lowered positions. For each pair of holes there is a shaft 15 which extends itself between the bars and through the corresponding holes. A lid 14, which is somewhat smaller than the free surface between the comer posts and large enough to cover all of the molds on one shelf, is attached to each shaft. Thus, the lid and shaft thus joined may rotate freely in the holes 20 of the bars 10, 11.

The end positions for the bars 10, 11 are so positioned that the lids rest on the molds when the bars are at their lowest positions and when. the bars are at their upper positions, the shafts are in contact with or very close to the nearest above positioned guides 7, 8.

The procedure at baking is as follows. The molds which have been filled with dough are put on trays 18. Using the above mentioned means the bars 10, 11 and thus the lids 14 are moved to their upper positions and are kept there while the plates are pushed in on the guide tails. When all of the plates have been put in, the bars and the lids are lowered so that the lids rest on the molds whereupon the cart is pushed into the rack oven and the baking takes place. When it is finished the cart is removed from the oven, the bars and the lids are raised in the same manner as before and the plates or the individual moulds are removed from the cart.

Figure 4:
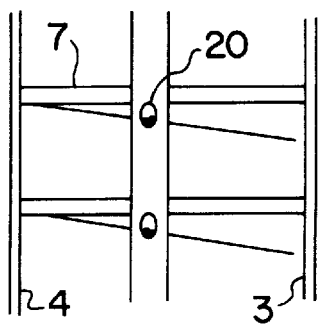
FIG. 4 shows the cart of FIG. 3 with the baking molds removed.

In a preferred embodiment of the invention, the lids 14 are attached to the underside parts of the shafts 15. The shafts are somewhat displaced relative to the middle of the lids so that the part of the lids which is towards the operating side turn upwards and so makes the removal of the molds easier. The movement is delimited by that the lids striking a stopper which can be the adjacent to and above guides or rails as shown in FIG. 4. Preferably the holes 20 are ellitical or elongated so that the lids have some freedom to get into individual positions.

What is claimed is:

1. A baking cart for rack ovens, comprising:

a stand with at least two pairs of horizontal rails constructed and arranged to directly support a baking mold or shelf supporting a mold, the at least two pairs of horizontal rails being positioned at levels above one another;

a lid for covering the mold;

a rotatable horizontal shaft positioned vertically between and at a right angle to the at least two horizontal rails, the horizontal shaft being connected to the lid covering the mold such that the lid may be tilted by rotational motion of the horizontal shaft, and the horizontal shaft being provided in the stand so as to be adjustable in a vertical direction in order to lift the lid of the mold.

2. The baking cart according to claim 1, further comprising:

vertical movable operating bars arranged on opposing sides of the baking cart perpendicular to the horizontal rails and connected to the horizontal shaft.

3. The baking cart according to claim 2, wherein the vertical movable operating bars are provided with oval openings through which the horizontal shaft extends.

4. The baking cart according to any one of claims 1, 2 or 3, wherein the horizontal shaft is connected to the lid at a position offset from a centerline of the lid so that the lid tilts.

* * * * *